(12) United States Patent
Schermerhorn (10) Patent No.: US 10,986,762 B2
(45) Date of Patent: Apr. 27, 2021

(54) BEACH UMBRELLA HOLE DIGGING DEVICE

(71) Applicant: William R. Schermerhorn, Colfax, NC (US)

(72) Inventor: William R. Schermerhorn, Colfax, NC (US)

(*) Notice: Subject to any disclaimer, the term of this patent is extended or adjusted under 35 U.S.C. 154(b) by 48 days.

(21) Appl. No.: 16/278,350

(22) Filed: Feb. 18, 2019

(65) Prior Publication Data

US 2020/0045866 A1 Feb. 13, 2020

Related U.S. Application Data

(63) Continuation-in-part of application No. 15/723,356, filed on Oct. 3, 2017, now Pat. No. 10,225,971.

(51) Int. Cl.
*A01B 1/00* (2006.01)

(52) U.S. Cl.
CPC ..................... *A01B 1/00* (2013.01)

(58) Field of Classification Search
CPC ... A01B 1/02; A01B 1/00; A01B 1/165; B25J 1/04; E04D 13/0765; E04H 15/60
See application file for complete search history.

(56) References Cited

U.S. PATENT DOCUMENTS

| | | | |
|---|---|---|---|
| 9,699,946 B2 * | 7/2017 | Bellah | G01B 3/28 |
| 10,225,971 B1 | 3/2019 | Schermerhorn | A01B 1/00 |
| 2009/0111659 A1 | 4/2009 | Xiang | 482/29 |
| 2011/0132420 A1 | 6/2011 | Livachich | 135/123 |
| 2011/0303255 A1 | 12/2011 | DeLap | 135/114 |
| 2012/0267131 A1 * | 10/2012 | De Oliveira | E04H 12/2215 172/381 |
| 2015/0176302 A1 | 6/2015 | Duqum | 135/114 |
| 2015/0368905 A1 | 12/2015 | Nichols | 134/8 |
| 2017/0112243 A1 * | 4/2017 | Letendre | A45B 25/08 |
| 2018/0128004 A1 * | 5/2018 | Washko | E04H 12/2246 |
| 2018/0238073 A1 * | 8/2018 | Laffy | E04H 12/2215 |
| 2018/0371784 A1 * | 12/2018 | Gonzalez | E04H 12/2246 |

FOREIGN PATENT DOCUMENTS

GB 2434069 A * 7/2007 ............. B65F 1/141

* cited by examiner

*Primary Examiner* — Stephen A Vu
(74) *Attorney, Agent, or Firm* — MacCord Mason PLLC (57) ABSTRACT

A device for excavating a precise plug of sand from a sand surface and umbrella assemblies are shown and described. In particular embodiments, a plunger includes a distal portion having a cavity, an elbow, and an elongated body separating said distal portion and the elbow. The result is a plunger and umbrella assemblies for excavating a precise, uniform hole substantially equivalent to the pole diameter.

15 Claims, 11 Drawing Sheets

BEACH UMBRELLA HOLE DIGGING DEVICE

This application is a Continuation-in-Part of U.S. Ser. No. 15/723,356, filed Oct. 3, 2017, which is incorporated herein by reference in its entirety.

BACKGROUND

Various types of digging devices are known in the prior art. However, many existing digging devices are labor intensive and unwieldy. When headed to the beach, most people with umbrellas forgo these tools altogether, and instead resort to using their hands or hammering the top of the umbrella pole. Not only are these methods difficult and uncomfortable, but they are also ineffective. A windy day on the beach can quickly turn disastrous as umbrellas with pointed poles go flying towards innocent bystanders. The use of a digging device is imperative to truly secure a beach umbrella, yet few existing devices are intended for small, precise holes. Of those digging devices that are intended for beach umbrellas, many are augers and need to be forcefully rotated into the sand. Furthermore, it is difficult to tell how deep a hole has been dub, resulting in frustrated users with uncomfortably low umbrellas. What is needed, and what the present beach umbrella hole digging device provides, is a digging device that quickly and easily makes the perfect hole for a beach umbrella. By using a hollow pipe with a plunger instead of an auger, the device is simply pressed into the ground a short distance and then removed to expel a plug of sand. Furthermore, it is marked at regular intervals on the outside in order to allow the user to achieve a precise depth.

FIELD

The present invention relates to digging devices, and more particularly, to a beach umbrella hole digging device.

SUMMARY

The general purpose of the present beach umbrella hole digging device, described subsequently in greater detail, is to provide a digging device that has many novel features that result in a digging device which is not anticipated, rendered obvious, suggested, or even implied by prior art, either alone or in combination thereof.

To accomplish this, the present digging device includes a tubular shaft having an exterior, an interior, a central axis, a length, on outer diameter, and an inner diameter. A plurality of evenly spaced horizontal demarcations is disposed on the exterior of the tubular shaft. Such demarcations allow a user to know exactly how deep a hole is being dug. A tubular T joint has an other diameter and an inner diameter, and the outer diameter of the tubular T is greater than the outer diameter of the tubular shaft. Furthermore, the inner diameter of the tubular T is approximately equal to the outer diameter of the tubular shaft, and each of the outer diameter of the tubular shaft and the inner diameter of the tubular T joint is configures such that the tubular T joint can receive the tubular shaft as a press fit.

The device further includes a pair of tubular handles, with each of the pair of tubular handles having a capped end, an open end, a thin section, and a thick section. The thick section terminates with the capped end, and the thin section terminates with the open end. The thick section of each of the pair of tubular handles has an outer diameter that is approximately equal to the outer diameter of the tubular T joint, and the thin section of each of the pair of tubular handles has an outer diameter that is approximately equal to the inner diameter of the T joint. The outer diameter of each of the thick sections and the thin section is configured such that the tubular T joint can receive each of the thin sections of each of the pair of tubular handles as press fit. The hole digging device takes the form of a cross, with a handle fit on each side of the tubular T joint and the tubular shaft extending from the bottom of the tubular T joint. In a preferred embodiment of the invention, the tubular T joint and the pair of tubular handles have a first cover that is shaped like the body and arms of an animal.

The top of the T joint has a tubular top extension having a thin side and a thick side. The thick side of the tubular top extension has an outer diameter that is approximately equal to the outer diameter of the tubular T joint, and the thin side of the tubular top extension has an outer diameter that is substantially conforms to the inner diameter of the T joint. The outer diameter of each of the thin side and the thick side is configured such that the tubular T joint can receive the thin side of the tubular top extension as a press fit. In the preferred embodiment of the invention, the tubular top extension has a second cover that is shaped like an animal head.

Inside the tubular shaft and passing through the tubular T joint there is a plunger rod having a length and a diameter. The length of the plunger rod is shorter than the length of the tubular shaft, and the diameter of the plunger rod is less Thant the inner diameter of the tubular shaft.

Fixed to the plunger rod is a tubular plunger stopper collar having an inner diameter, an outer diameter, and a length. The inner diameter of the plunger stopper collar substantially conforms to the diameter of the plunger rod, the outer diameter of the plunger stopper collar substantially conforms to the inner diameter of the tubular shaft, and the length of the plunger stopper collar is less than the length of the tubular shaft. Each of the inner diameter and the outer diameter is configured such that the plunger stopper collar can receive the plunger rod as a press fit, and the tubular shaft can receive the plunger stopper collar as a slip fit. A plurality of grooves is disposed of the tubular plunger stopper collar. Each of the plurality of groves is substantially parallel to the central axis of the tubular shaft. The plurality of grooves is slidable throughout the inside of the tubular shaft while disposed to the plunger rod. The allows the plunger rod to slide through the tubular shaft and partially out the top of the tubular top extension, yet prevents the tubular shaft from coming all the out.

Lastly, the device includes a hollow plunger top having an opening. The opening has a diameter substantially conforming to the outer diameter of the cylindrical rod, which allows it to be fixed onto the cylindrical rod, which allows it to be fixed onto the cylindrical plunger rod as a press fit.

In one embodiment, a device for excavating a precise plug of sand from a sand surface includes a distal portion having a cavity; an elbow having an inner face consisting of about a three and five eighths inch radius and an outer face with about a four and seven eighths inch radius; and an elongated body separating the distal portion and the elbow.

In certain examples, a closed proximate portion is substantially adjacent the elbow. The closed proximate portion may be offset about forty five degrees from a vertical centerline of the elongated body. The closed proximate portion may include a stop, for instance a cap. The elongated body may have a tubular shaft having an exterior, an interior, a central axis, a length, an outer diameter, and an inner diameter. The elongated body may have plurality of horizontal demarcations disposed on the exterior of the tubular shaft, wherein the plurality of horizontal demarcations is evenly spaced along the length of the tubular shaft.

In particular examples, the elbow may have at least one inner curved face and at least one outer curved face. Further, the distal portion may have a permanently open entry and discharge port.

In another embodiment, an umbrella assembly includes an umbrella having a canopy and an opposing pole with a diameter; and a plunger adapted for excavating a uniform hole in a sand surface. Typically, the plunger includes an open distal portion adapted to penetrate the sand surface; an elongated body; and an angled proximate portion opposite the distal portion and adapted to evacuate a uniform plug of sand having a diameter substantially equivalent to the pole diameter.

In certain examples, the proximate portion opposite the distal portion is closed and offset about forty-five degrees from a vertical centerline of the elongated body. The device may include an elbow spaced between the elongated body and the proximate portion.

In yet another embodiment, an umbrella hole plunger adapted for excavating uniform holes in a sand surface includes open distal portion adapted to penetrate the sand surface; an elongated body extending from the open distal portion; and a closed proximate portion opposite the distal portion and offset about forty-five degrees from a vertical centerline of the elongated body, and typically the device adapted to evacuate a uniform plug of sand.

In particular examples, the elongated body comprises a tubular shaft having an exterior, an interior, a central axis, a length, an outer diameter, and an inner diameter. The device may include a plurality of horizontal demarcations disposed on the exterior of the tubular shaft, wherein the plurality of horizontal demarcations is evenly spaced along the length of the tubular shaft. The device may include an elbow aligned between the elongated body and the closed proximate portion. The elbow may have an inner curved face and an outer curved face.

In some examples, the open distal portion comprises a permanently open entry adapted to receive the uniform plug of sand and discharge the uniform plug of sand. The closed proximate portion may have a stop, for instance a cap.

Thus have been broadly outlined the more important features of the present digging device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 11 thereof, an example of the present beach umbrella hole digging device employing the principles and concepts of the present beach umbrella hole digging device and generally designated by the reference number 10 will be described.

Referring to FIGS. 1 through 11 the present beach umbrella hole digging device 10 is illustrated. The beach umbrella hole digging device 10 includes a tubular shaft 20 having an exterior 22, an interior 24, a central axis 26, a length 28, an outer diameter 30, and an inner diameter 32, wherein the plunger device 100 includes open distal portion 102, elongated body 106, elbow 108, and closed proximate portion 110. A plurality of evenly spaced horizontal demarcations 34 is disposed on the exterior of the tubular shaft.

A tubular T joint 40 has an outer diameter 42 and an inner diameter 44. The outer diameter of the tubular T joint 42 is greater than the outer diameter of the tubular shaft 30, and the inner diameter of the tubular T joint 44 substantially conforms to the outer diameter of the tubular shaft 30. Each of the outer diameter of the tubular shaft 30 and the inner diameter of the tubular T joint 44 is configured such that the tubular T joint 40 can receive the tubular shaft 20 as a press fit.

A pair of tubular handles 48 has a capped end 50, an open end 52, a thin section 54, and a thick section 55. The thick section 55 terminates with the capped end 50, and the thin section 54 terminates with the open end 52. Furthermore, the thick section of each of the pair of tubular handles 55 has an outer diameter 56 that substantially conforms to the outer diameter of the tubular T joint 42, and the thin section of each of the pair of tubular handles 54 has an outer diameter 57 that substantially conforms to the inner diameter of the T joint 44. The outer diameter of each of the thick section 56 and the thin section 57 is configured such that the tubular T joint 40 can receive each of the thin sections of each of the pair of tubular handles 54 as a press fit. In a preferred embodiment of the invention, the tubular T joint 40 and the pair of tubular handles 48 have a first cover 41 that is shaped like the body and arms of an animal.

A tubular top extension 60 has a thin side 62 and a thick side 64. The thick side of the tubular top extension 64 has an outer diameter 66 that substantially conforms to the outer diameter of the tubular T joint 42, and the thin side of the tubular top extension 62 has an outer diameter 68 that substantially conforms to the inner diameter of the T joint 44. The outer diameter of each of the tin side 68 and the thick side 66 is configured such that the tubular T joint 40 can receive the thin side of the tubular top extension 62 as a press fit. In the preferred embodiment of the invention, the tubular top extension 60 has a second cover 61 that is shaped like an animal head.

A cylindrical plunger rod 70 has a length 72 and a diameter 74. The length of the plunger rod 72 is shorter than the length of the tubular shaft 28, and the diameter of the plunger rod 74 is less than the inner diameter of the tubular shaft 32.

A tubular plunger stopper collar 76 has an inner diameter 78, an outer diameter 80, and a length 82, with the inner diameter of the plunger stopper collar 78 substantially conforming to the diameter of the plunger rod 74, the outer diameter of the plunger stopper collar 80 substantially conforming to the inner diameter of the tubular shaft 32, and the length of the stopper collar 82 is less than the length of the tubular shaft 28. Each of the inner diameter 78 and the outer diameter 80 is configured such that the plunger stopper collar 76 can receive the plunger rod 70 as a press fit, and the tubular shaft 20 can receive the plunger stopper collar 76 as a slip fit.

A plurality of grooves 86 is disposed on the tubular plunger stopper collar 76. Each of the plurality of grooves 86 is substantially parallel to the central axis of the tubular shaft 26. The plurality of grooves 86 is slidable throughout the inside of the tubular shaft 24 while disposed to the plunger rod 70.

A hollow plunger top 90 has an opening 92. The opening has a diameter 94 substantially conforming to the outer diameter of the cylindrical rod 70, with the opening 92 fittable onto the cylindrical rod 70 as a press fit.

Figure 1:
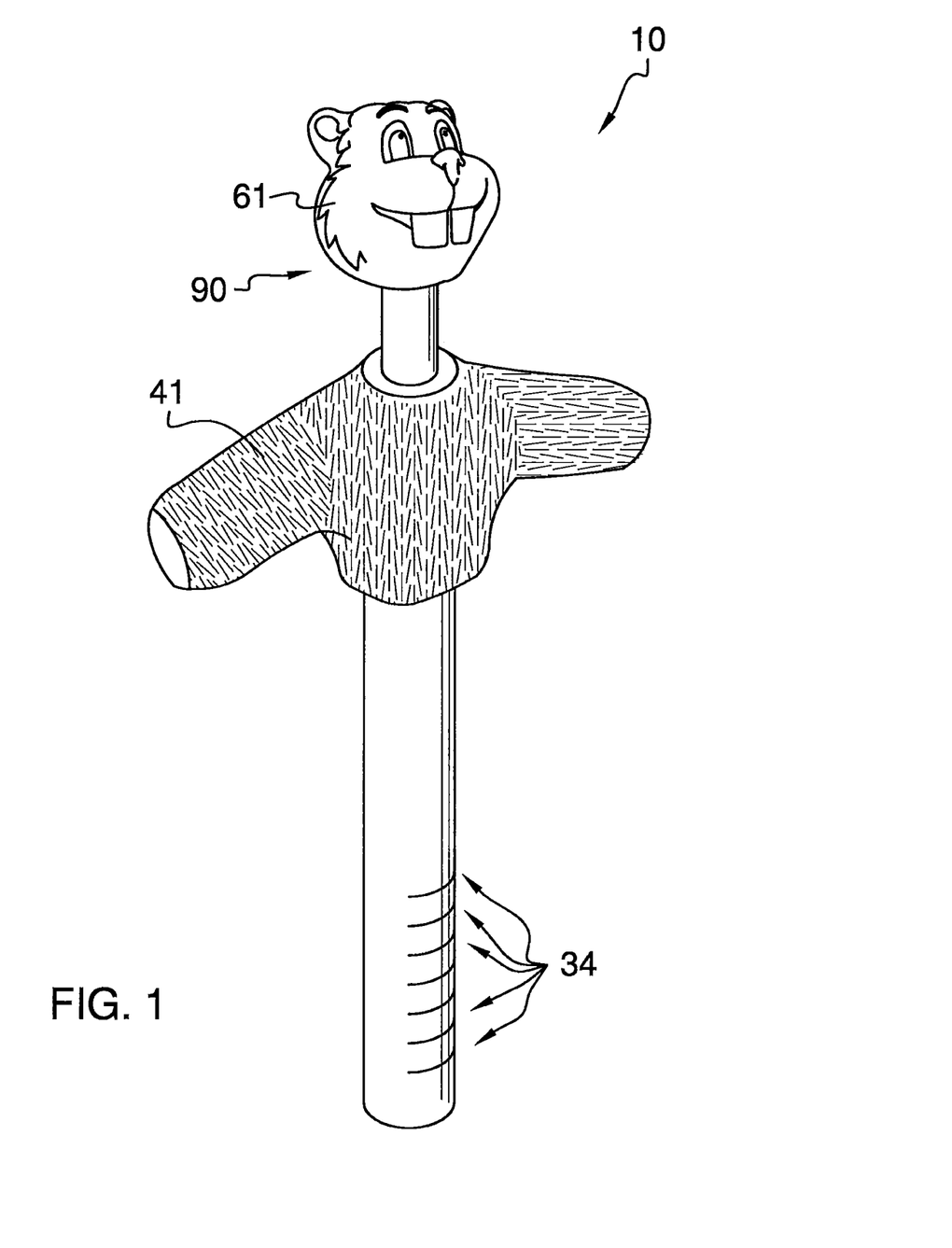
FIG. 1 is an isometric view showing a breach umbrella hole digging device in its entirety.
Figure 2:
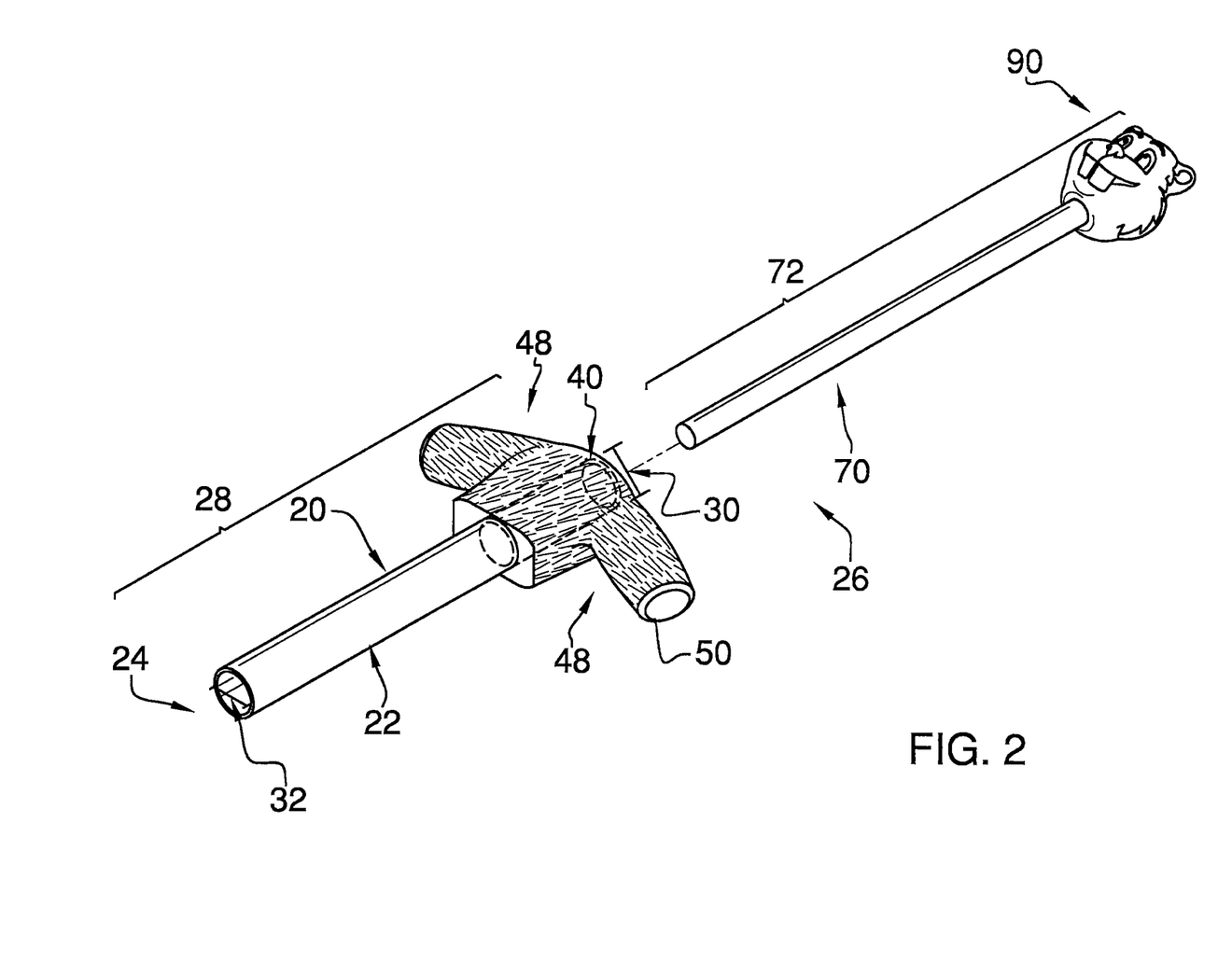
FIG. 2 is an exploded isometric view showing a plurality of components of the beach umbrella hole digging device and highlighting the simplicity of its construction.
Figure 3:
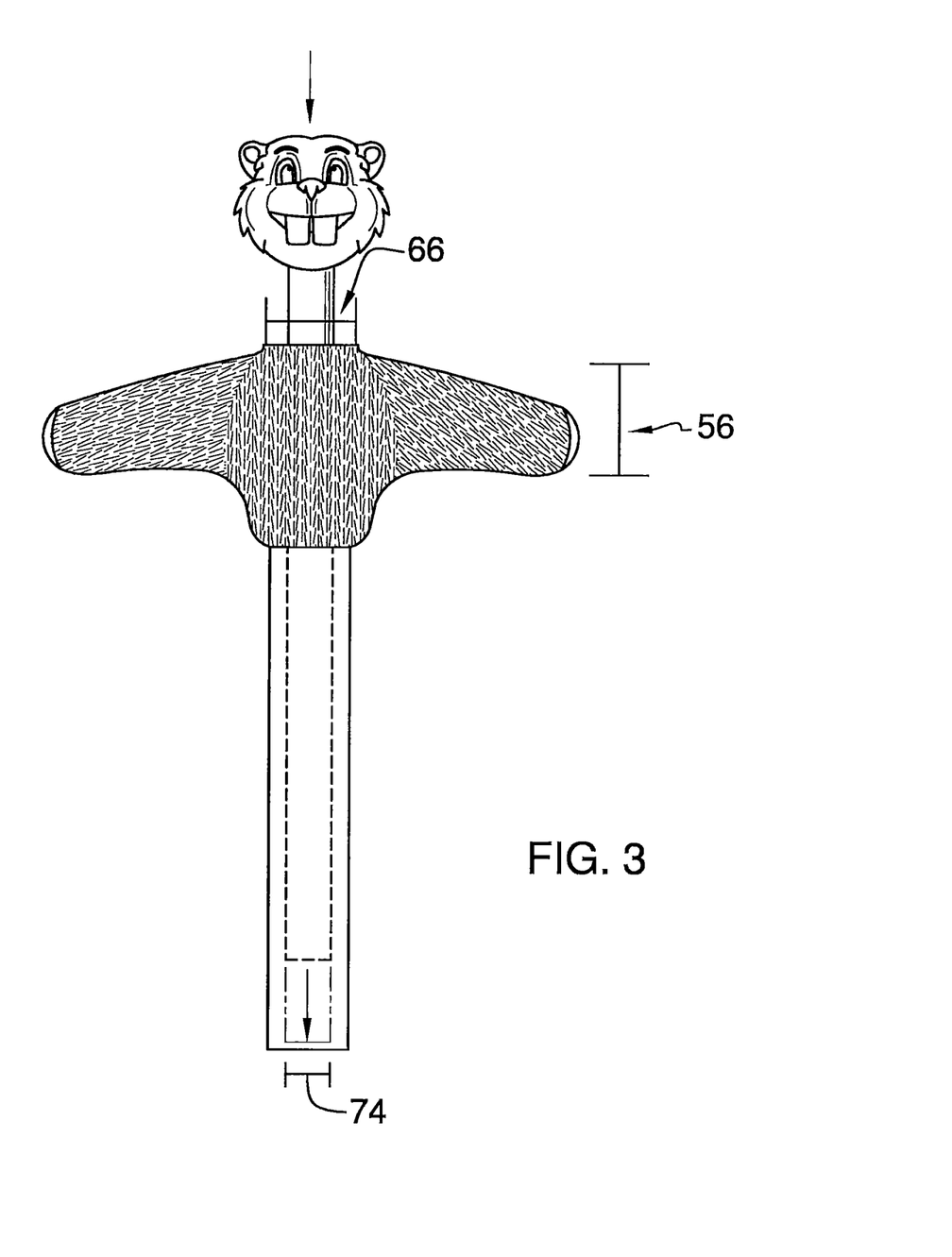
FIG. 3 is a front elevation view showing the components joined together.
Figure 4:
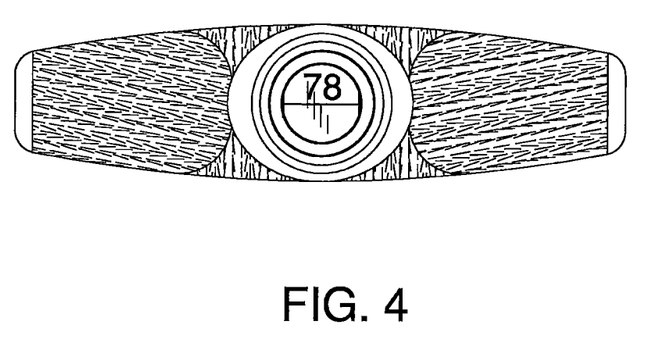
FIG. 4 is a bottom view.
Figure 5:
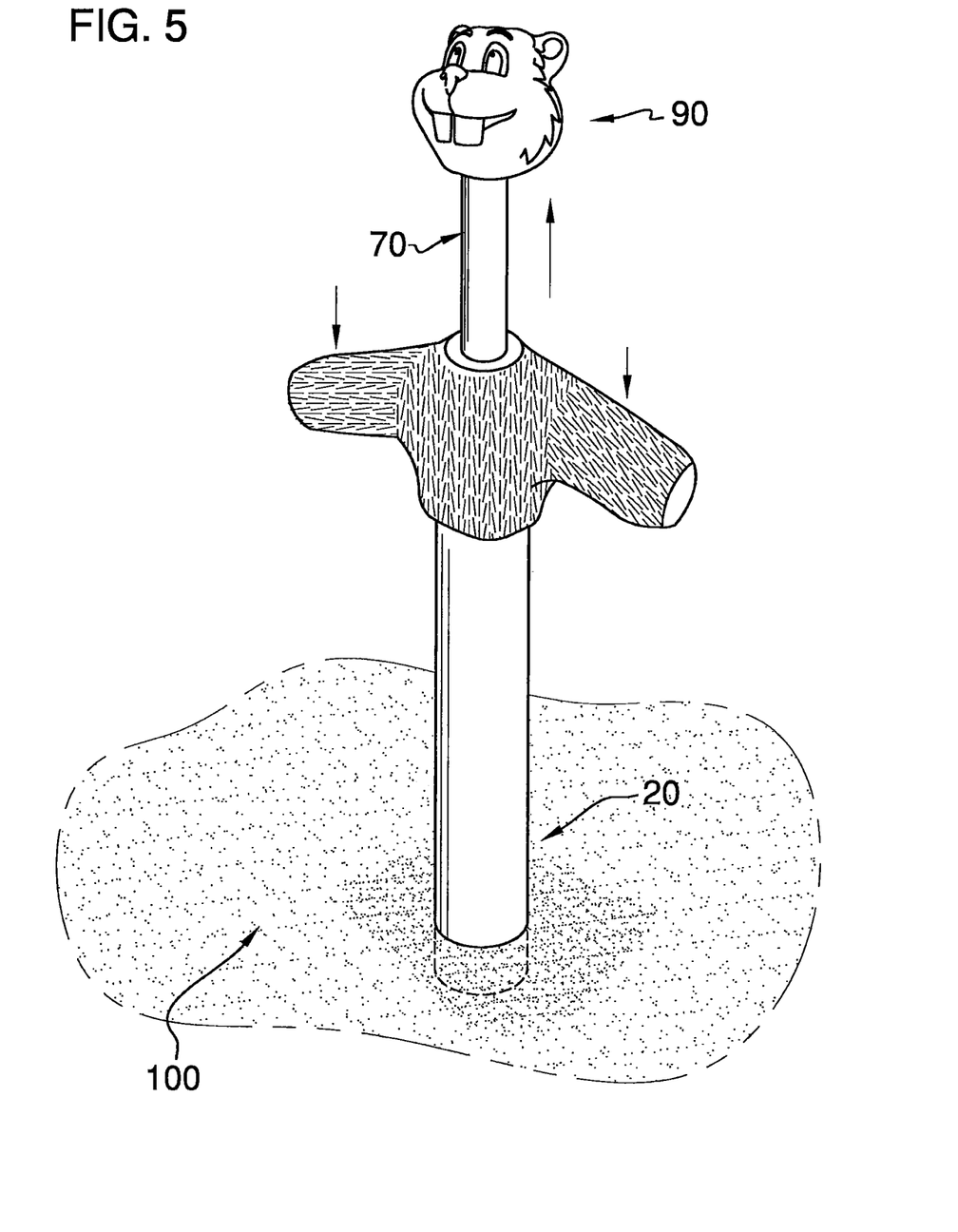
FIG. 5 is an in use isometric view showing the beach umbrella hole digging device inserted into a plot of sand.
Figure 6:
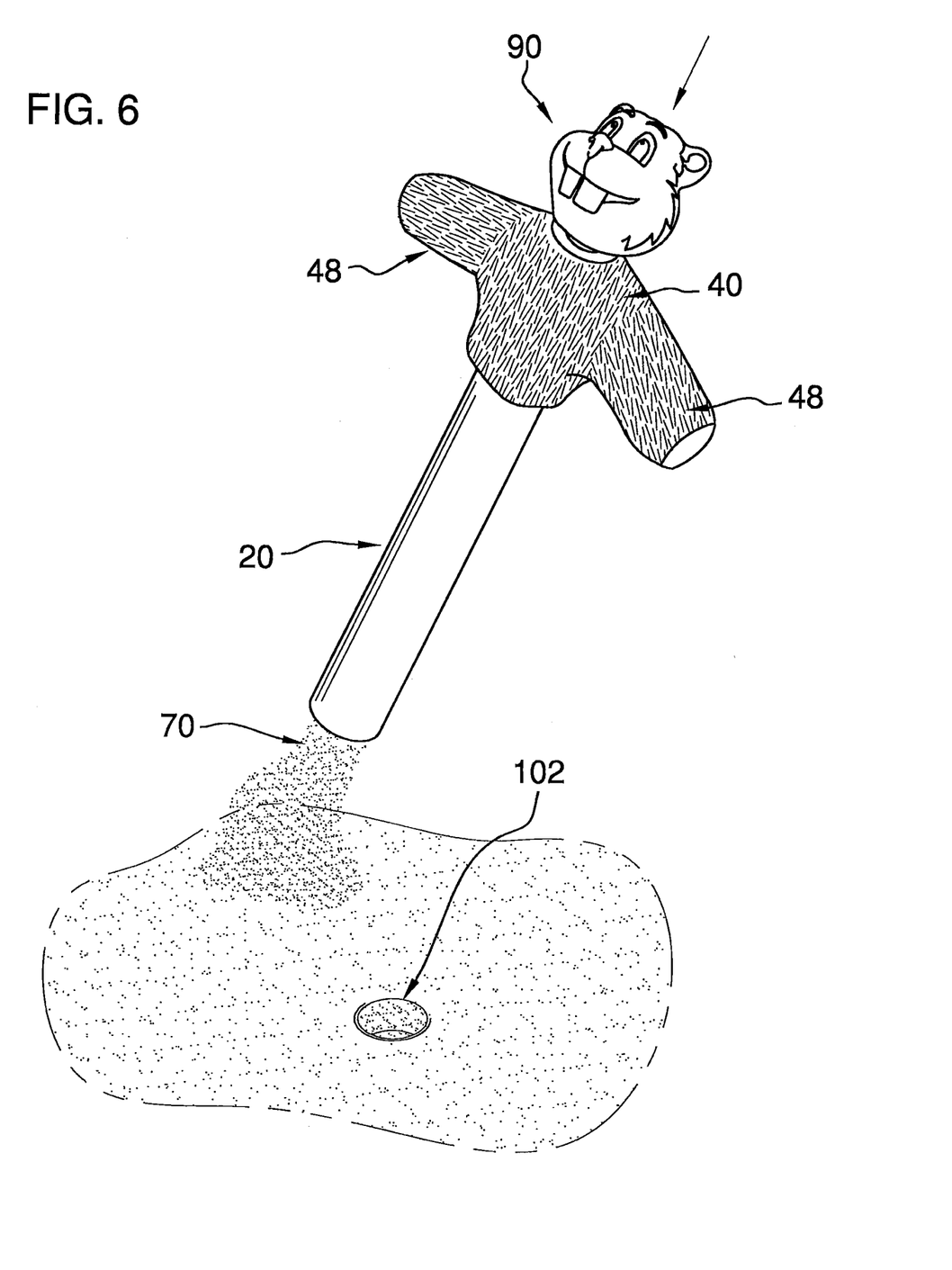
FIG. 6 is an in use isometric view showing the beach umbrella hole digging device dive removed from the sand and with a plunger rod extended through the bottom of a tubular shaft.
Figure 7:
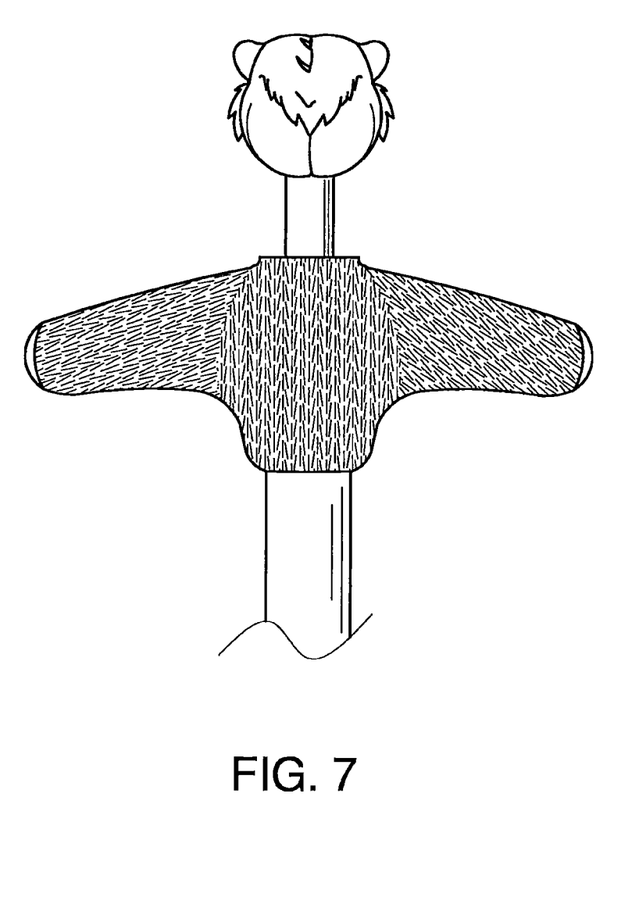
FIG. 7 is a rear view showing the beach umbrella hole digging device.
Figure 8:
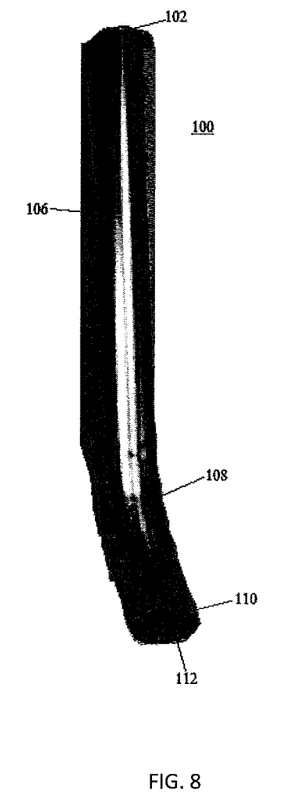
FIG. 8 is a top view showing one embodiment of a plunger device.
Figure 9:
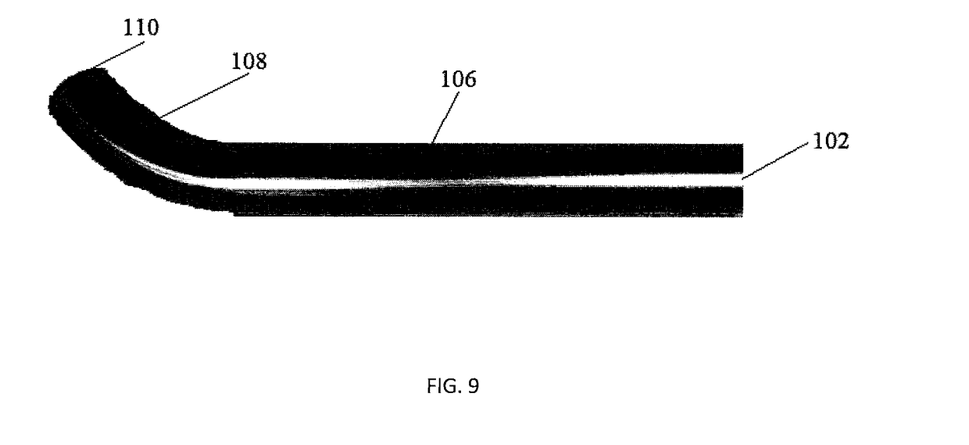
FIG. 9 is a side view of the plunger introduced in FIG. 8.
Figure 10:
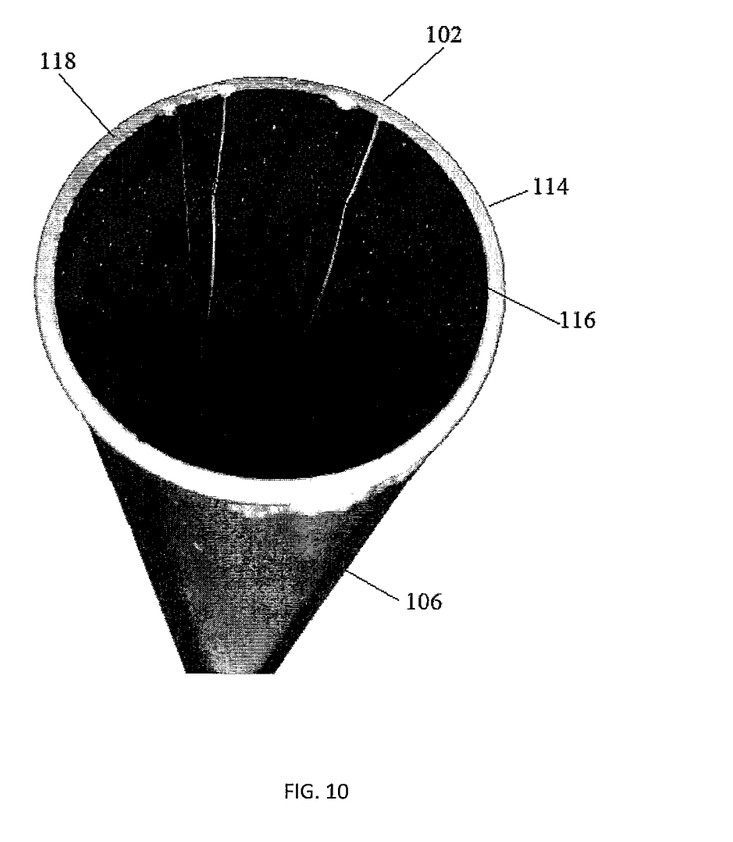
FIG. 10 is a front view of the plunger introduced in FIG. 8.
Figure 11:
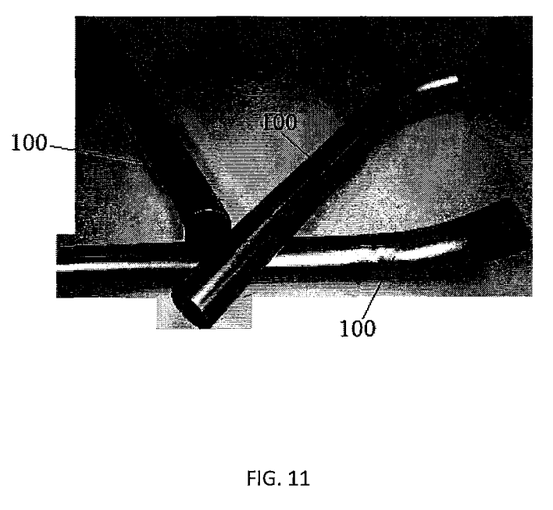
FIG. 11 a side perspective view of plungers introduced in FIG. 8.

The beach umbrella hole digging device 10 is configured to be inserted into a plot of sand. The device is then removed from the sand and the plunger rod 70 is pushed through the tubular shaft 20 to expel the collected sand, forming a hole 102.

Precision excavating tool 100 is generally constructed of metal, or any other suitable material, to support operating procedures shown and described herein and strength to withstand forces and stresses involved with operation of receiving a uniform plug of sand and excavating the plug of sand, for instance via a releasing, whipping, or similar evacuation movement. As introduced in FIGS. 8-11, umbrella hole plunger 100 generally includes open distal portion 102 to penetrate the sand surface. The elongated body 106 extends from open distal portion 102 to elbow 108. The closed proximate portion 110 is opposite distal portion 102, and in particular embodiments offset about forty-five degrees from a vertical centerline of elongated body 106. Applicant has discovered unexpected advantages of an elbow 108 with an inner face having about a three and five eighths inch radius, and an outer face having about a four and seven eighths inch radius to provide the proper leverage and evacuation advantages shown and described herein. Those skilled in the art having the benefit of this disclosure will recognize additional elbow dimensions and features. The elongated body 106 and/or distal portion 102 may have a tubular shaft 118 having an exterior 114, an interior 116, a central axis, a length, an outer diameter, for instance in one example sized substantially consistent with the diameter of an umbrella pole, and an inner diameter. Further, as shown, elbow 108 and offset proximate portion 110 may be tubular in form as extensions to support alignment and positioning of any of the features and advantages shown and described herein.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

Certain modifications and improvements will occur to those skilled in the art upon a reading of the foregoing description. By way of example, the present disclosures may be applied to corrugated mediums other than those having a single wall. For instance, the corrugated medium may comprise a double or triple wall board. It should be understood that all such modifications and improvements have been deleted herein for the sake of conciseness and readability but are properly within the scope of the following claims.

What is claimed is:

1. An umbrella hole plunger adapted for excavating uniform holes in a sand surface, said umbrella hole plunger consisting:
   a. an open distal portion adapted to penetrate said sand surface;
   b. an elongated body extending from said open distal portion;
   c. a closed proximate portion opposite said distal portion and offset about forty-five degrees from a vertical centerline of said elongated body, and
   d. an elbow aligned between said elongated body and said closed proximate portion, wherein said elbow includes an inner curved face adapted to substantially contact sand in an operating position and an outer curved face, and wherein said umbrella hole plunger evacuates sand consisting of a uniform plug of sand.

2. The umbrella hole plunger of claim 1, wherein said elongated body comprises a tubular shaft having an exterior, an interior, a central axis, a length, an outer diameter, and an inner diameter.

3. The umbrella hole plunger of claim 2, further including a plurality of horizontal demarcations disposed on the exterior of the tubular shaft, wherein the plurality of horizontal demarcations is evenly spaced along the length of the tubular shaft.

4. The umbrella hole plunger of claim 1, wherein said open distal portion comprises a permanently open entry adapted to receive said uniform plug of sand and discharge said uniform plug of sand.

5. The umbrella hole plunger of claim 1, wherein said closed proximate portion includes a stop.

6. The umbrella hole plunger of claim 5, wherein said stop comprises a cap.

7. A device for excavating a precise plug of sand from a sand surface, said device consisting:
   a. a distal portion having a cavity;
   b. an elbow having an inner curved face consisting of about a three and five eighths inch radius adapted to substantially contact sand and an outer curved face with about a four and seven eighths inch radius; and
   c. an elongated body separating said distal portion and said elbow, and wherein said umbrella hole plunger evacuates sand consisting of a uniform precise plug of sand.

8. The device of claim 7, including a closed proximate portion adjacent said elbow.

9. The device of claim 8, wherein said closed proximate portion being offset about forty five degrees from a vertical centerline of said elongated body.

10. The device of claim 8, wherein said closed proximate portion includes a stop.

11. The device of claim 10, wherein said stop comprises a cap.

12. The device of claim 7, wherein said elongated body comprises a tubular shaft having an exterior, an interior, a central axis, a length, an outer diameter, and an inner diameter.

13. The device of claim 12, further including a plurality of horizontal demarcations disposed on the exterior of the tubular shaft, wherein the plurality of horizontal demarcations is evenly spaced along the length of the tubular shaft.

14. The device of claim 7, wherein said elbow includes at least one inner curved face and at least one outer curved face.

15. The device of claim 7, wherein said distal portion comprises a permanently open entry and discharge port.

* * * * *